(12) United States Patent
Hirano (10) Patent No.: US 9,077,951 B2
(45) Date of Patent: Jul. 7, 2015

(54) TELEVISION PROGRAM SELECTION SYSTEM, RECOMMENDATION METHOD AND RECORDING METHOD

(75) Inventor: Kazumi Hirano, Barcelona (ES)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 12/832,478

(22) Filed: Jul. 8, 2010

(65) Prior Publication Data

US 2011/0008019 A1    Jan. 13, 2011

(30) Foreign Application Priority Data

Jul. 9, 2009   (EP) .................................... 09165011

(51) Int. Cl.
| | |
|---|---|
| *H04N 5/77* | (2006.01) |
| *H04N 9/80* | (2006.01) |
| *H04N 5/782* | (2006.01) |
| *H04N 21/4223* | (2011.01) |
| *H04N 21/442* | (2011.01) |

(Continued)

(52) U.S. Cl.
CPC ........... *H04N 5/782* (2013.01); *H04N 21/4223* (2013.01); *H04N 21/44218* (2013.01); *H04N 21/4532* (2013.01); *H04N 21/47214* (2013.01); *H04N 21/4751* (2013.01); *H04N 21/482* (2013.01); *H04N 21/4826* (2013.01)

(58) Field of Classification Search
CPC ..... H04N 5/772; H04N 1/2112; H04N 5/907; H04N 2101/00; H04N 5/232; H04N 5/9201; H04N 5/85; H04N 5/782; H04N 21/47214; H04N 21/4334; H04N 5/76; H04N 5/765; H04N 5/781; G11B 27/34; G11B 27/034; G11B 27/105; G11B 27/11

USPC ........................................... 386/224, 242, 227
See application file for complete search history.

(56) References Cited

U.S. PATENT DOCUMENTS

| | | | |
|---|---|---|---|
| 6,614,987 B1 | 9/2003 | Ismail et al. | |
| 7,466,898 B2 * | 12/2008 | Ohashi | .......................... 386/241 |

(Continued)

FOREIGN PATENT DOCUMENTS

| | | |
|---|---|---|
| CN | 1921607 A | 2/2007 |
| CN | 101427262 A | 5/2009 |

(Continued)

OTHER PUBLICATIONS

U.S. Appl. No. 12/832,506, filed Jul. 8, 2010, Hirano.

(Continued)

*Primary Examiner* — Nigar Chowdhury
(74) *Attorney, Agent, or Firm* — Oblon, McClelland, Maier & Neustadt, L.L.P.

(57) ABSTRACT

The present invention relates to a television program selection system, a recommendation method for recommending a selected television program and a recording method for recording a selected television program. Therefore, in a storage face data of one or more users and preference data associated to the face data are stored, wherein said preference data indicating preferences of the user. A camera captures an image of a user. A recommendation device then searches the attribute data of television programs currently available and selects in case that the captured image corresponds to one of the stored face data at least one television program having attribute data matching the associated stored preference data for display, recommendation, recording or other processes.

18 Claims, 8 Drawing Sheets

(51) Int. Cl.
*H04N 21/45* (2011.01)
*H04N 21/472* (2011.01)
*H04N 21/475* (2011.01)
*H04N 21/482* (2011.01)

(56) References Cited

U.S. PATENT DOCUMENTS

| | | | |
|---|---|---|---|
| 7,650,057 B2 * | 1/2010 | Takeshita | 386/248 |
| 2002/0186867 A1 | 12/2002 | Gutta et al. | |
| 2003/0023972 A1 * | 1/2003 | Gutta et al. | 725/34 |
| 2003/0088872 A1 * | 5/2003 | Maissel et al. | 725/46 |
| 2003/0225777 A1 | 12/2003 | Marsh | |
| 2006/0294558 A1 * | 12/2006 | Morris et al. | 725/89 |
| 2009/0158342 A1 * | 6/2009 | Mercer et al. | 725/46 |

FOREIGN PATENT DOCUMENTS

| | | |
|---|---|---|
| JP | 2006-100881 | 4/2006 |
| WO | WO 02/32136 A2 | 4/2002 |

OTHER PUBLICATIONS

"'Recognize' the Difference", Viewdle, Inc. 2007-2008. 2 pages. Accessed Jul. 6, 2010. http://web.archive.org/web/20080708092054/www.viewdle.com/overview.html.

"Face Recognition via Sparse Representation", Last Modified Jun. 27, 2010. 4 pages. http://perception.csl.uiuc.edu/recognition/Home.html.

Search Report issued Feb. 11, 2014 in Chinese Patent Application No. 201010225817.0 (submitting English translation only).

* cited by examiner

TELEVISION PROGRAM SELECTION SYSTEM, RECOMMENDATION METHOD AND RECORDING METHOD

The present invention relates to a television program selection system, to a recommendation method for recommending a selected television program and to a recording method for recording a selected television program. More specifically, the present invention relates to a television program selection system, a recommendation method and a recording method which use a camera in order to select, recommend and/or record a television program.

In recent times the number of television programs or generally of displayable contents which are available for a user is constantly increasing. In addition to an increasing number of channels other sources such as the internet or storage media provide a variety of different television programs. This makes it more difficult for the user to have an overview over all available programs and to select a preferred program without the risk of overlooking one of his favorite television programs.

It is therefore a major task to provide selection systems or recommendation systems which aid the user in selecting a television program. Some of the present televisions recommend television programs based on key words which have been previously input by a user. However, users have to preliminary input key words for this function.

A further problem is that the television cannot select appropriate television programs for different users because they are not adapted to recognize which user has input the key words and wants to watch the corresponding television programs.

It is therefore the objective problem of the present invention to improve the prior art. Specifically, it is an object of the present invention to provide a television program selection system, a recommendation method and a recording method which enable an improved selection of television programs.

This object is solved by the features of the independent claims.

In one aspect, the present invention relates to a television program selection system, comprising a storage for storing face data of one or more users and for storing preference data associated to the face data, said preference data indicating preferences of the user, a camera for capturing an image of a user, and a recommendation device for searching the attribute data of television programs currently available and for selecting in case that the captured image corresponds to one of the stored face data at least one television program having attribute data matching the associated stored preference data.

According to a further aspect the present invention relates to a recording method for recording a selected television program, comprising the steps of storing face data of one or more users and for storing preference data associated to the face data, said preference data indicating preferences of the user, capturing an image of a user, searching the attribute data of television programs currently available, selecting in case that the captured image corresponds to one of the stored face data at least one television program having attribute data matching the associated stored preference data, and issuing a recoding command to a recording device to record the selected television program.

According to a further aspect the present invention relates to a recommendation method for recommending a selected television program, comprising the steps of storing face data of one or more users and for storing preference data associated to the face data, said preference data indicating preferences of the user, capturing an image of a user, searching the attribute data of television programs currently available, selecting in case that the captured image corresponds to one of the stored face data at least one television program having attribute data matching the associated stored preference data, and recommending the selected television program.

Advantageous features and embodiment are the subject-matter of the dependent claims.

The present invention will now be explained in more detail in the following description of preferred embodiments in relation to the enclosed drawings in which.

Figure 1:
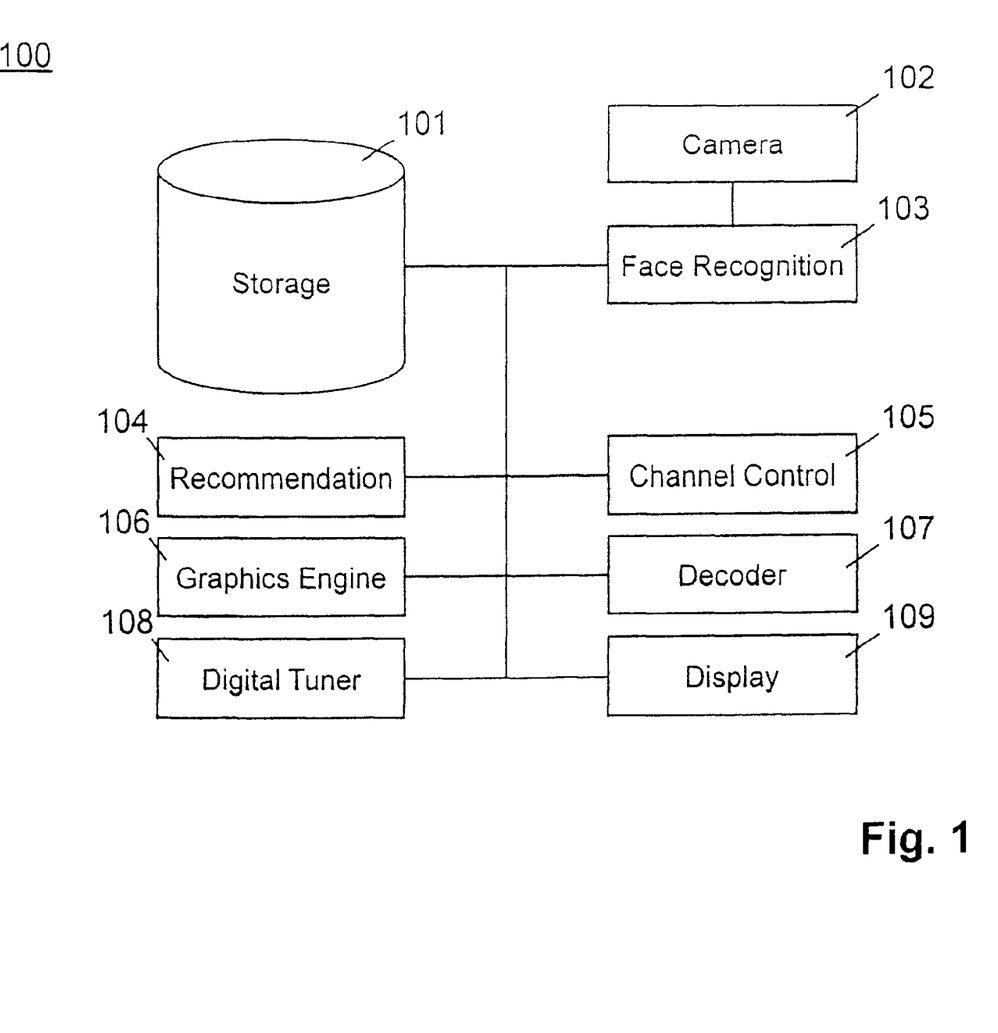
FIG. 1 shows a first embodiment of a television program selection system according to the present invention.

FIG. 1 shows a first embodiment of a television program selection system 100. The components shown in FIG. 1 can be all or partly integrated into a television. If only a part of the components is integrated into a television, then the other components can be integrated into one or more external components which are connected to and in data communication with the television.

The television program selection system 100 as shown in FIG. 1 of course comprises all further features necessary enabling the functionality, such as a power source or the like, which are omitted in the figures for the sake of clarity.

In the following description, the inventive system and method will be explained with reference to the term "television program". However, this term is intended to encompass all types of video content, which are displayable on a display, panel or monitor.

The television program selection system 100 comprises a storage 101. The storage can be divided into one or more storage parts being volatile and/or non-volatile memory parts.

The television program selection system 100 further comprises a camera 102 which is adapted to take pictures or images from objects in the environment of the television program selection system. The camera 102 can be adapted to take still images and/or video. The camera 102 is connected to and in data communication with a face recognition device 103. The face recognition device 103 is adapted to carry out a face recognition based on images submitted by the camera 102. The face recognition is hereby carried out according to known methods, for example the algorithms according to Viewdle or UIUC. But also any other present or future face recognition algorithm can be used.

The system 100 further comprises a display 109 for displaying video content or image content. The display 109 can be any type of known or future display devices, for example liquid crystal display panels (LCD), thin-film transistor displays (TFT), color sequential displays, plasma display panels (PDP), digital micro mirror devices or organic light emitting diode (OLED) displays or any other type of display. Connected to the display is a graphics engine 106 which controls the display 109.

The television program selection system 100 further comprises a decoder 107 for receiving television programs which are broadcast. A digital tuner 108 is adapted to select a frequency in order to show a specific television program and therefore a channel control 105 is adapted to control the digital tuner 108 in order to select the channel to be displayed on the display 109 and to change the frequency of the digital tuner 108.

However, FIG. 1 is only an exemplary embodiment having components for receiving and displaying television programs, but the present invention is not limited to the shown components and structure, but can be adapted to any other system comprising means enabling a reception of television programs from an arbitrary source and enabling the display of the television programs.

The television program selection system 100 additionally comprises a recommendation device 104 for selecting a television program out of all television programs which are currently available. The selection process will be explained in detail in the following.

According to the present invention in the storage 101 face data of one or more users are stored and additionally preference data of the one or more users are stored and associated with the stored face data.

The preference data comprises information on preferences, habits and/or key words input by the user indicating attributes of preferred television programs.

If a user starts using the television program selection system, then the camera 102 captures an image of the user. The face recognition device 103 then accomplishes a face recognition of the face within the image captured by the camera 102.

The recognized face is transmitted to the recommendation device 104, which compares the recognized face with face data stored in the storage 101. If the captured face data correspond to face data stored in the storage 101, then the recommendation device 104 will select a program out of all programs currently available which matches to the preferences stored with the corresponding face data.

More specifically, the recommendation device 104 receives a list of all programs currently available either via the decoder 107, via an external device which is connected to the television program selection system, via the internet or via any other available source. Together with each television program attribute data are received describing attributes and features of each television program.

The recommendation device 104 compares the attribute data of the television programs with the preference data stored and associated to the stored face data and selects the program having attribute data matching the preference data.

Figure 2:
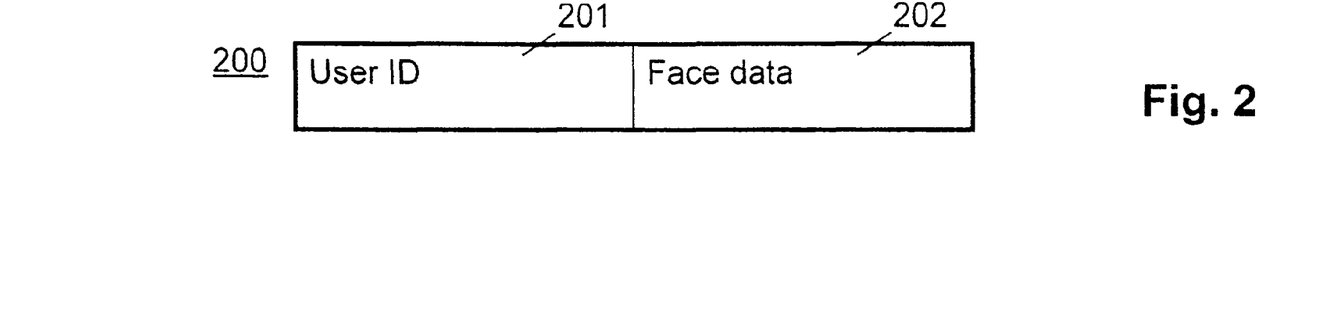
FIGS. 2 and 3 show an embodiment of user related data stored in the storage according to the present invention.
Figure 3:
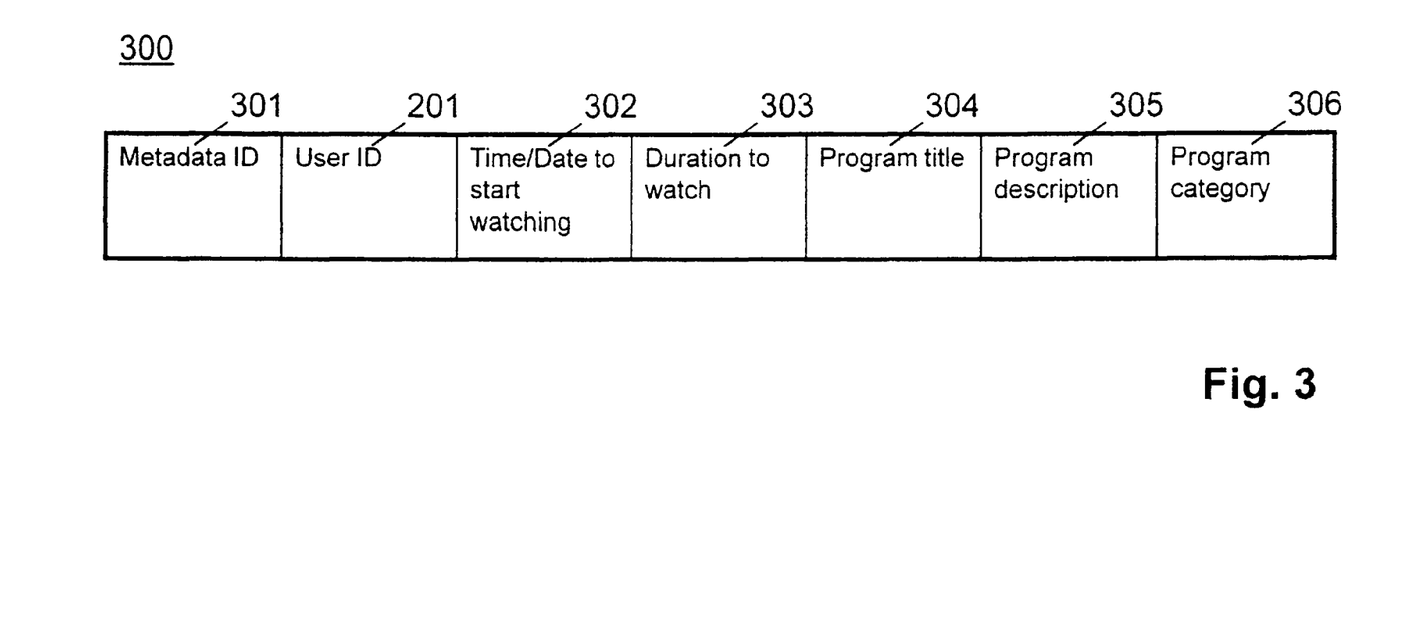

An example of data stored in the storage 101 is shown in FIGS. 2 and 3.

In FIG. 2 an example of a user entry 200 is shown. The user entry in the present embodiment comprises a user identification, i.e. a user ID 201 which uniquely identifies a user. The user ID 201 can be any combination of symbols and/or icons uniquely identifying a user. The user entry 200 further comprises face data 202 of the corresponding user. The face data can either be a stored image and/or a set of data indicating important features within the face of the user in order to enable a proper match between the store face data 202 and those face data which are transmitted by the face recognition device 103.

FIG. 3 shows an example of attribute data of a television program stored together with the user ID 201. The attribute data can be metadata or can comprise metadata and additionally other data indicating attributes of the television program. The attribute data can comprise a metadata ID 301, a time and/or date where the user starts watching, a watch duration 303, program title 304, program description 305, program category 306 and/or any other type of attribute data describing a television program. Further data could be the publication year of the program, actors playing within the program or the like.

In the preferred embodiment, for each television program one specific user has watched the corresponding attribute data are stored and associated to the user ID 201, if present, and/or associated to the face data 202. The one or more sets of attribute data representing different preferred television programs thus represent the preference data of a user indicating his preferences with respect to television programs.

The attribute data 300 can either be associated to the user ID 201 or the user ID 201 can also be omitted and the attribute data can be associated directly to the stored face data 202.

Figure 4:
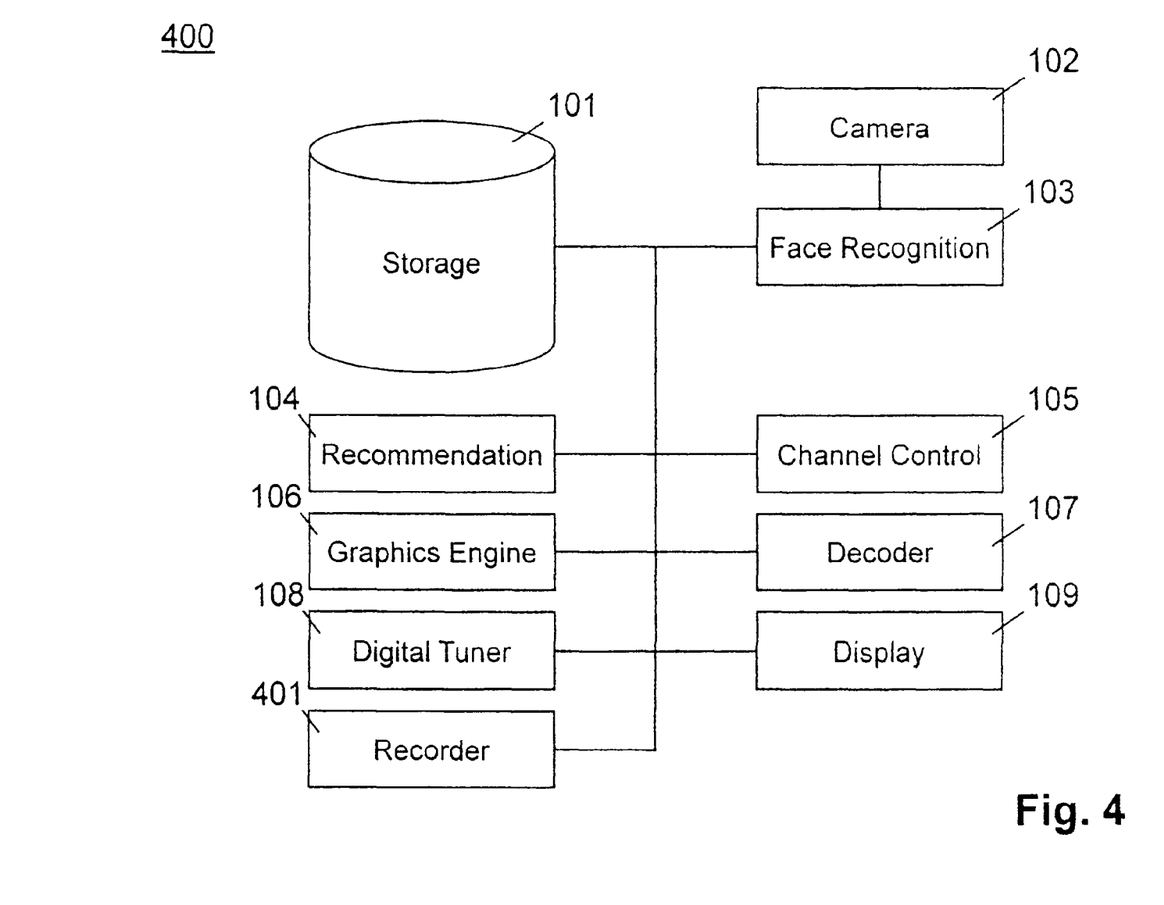
FIG. 4 shows a second embodiment of a television program selection system according to the present invention.

FIG. 4 shows a second embodiment of a television program selection system 400 according to the present invention. The television program selection system 400 corresponds to the one shown in FIG. 1 but additionally comprises a recorder 401 for issuing a command to record content in the storage 101.

In this embodiment it is possible that the recommendation device 104 can send a recording instruction to the recorder 401 to record a selected television program whose attribute data match the preference data of the user.

Figure 5:
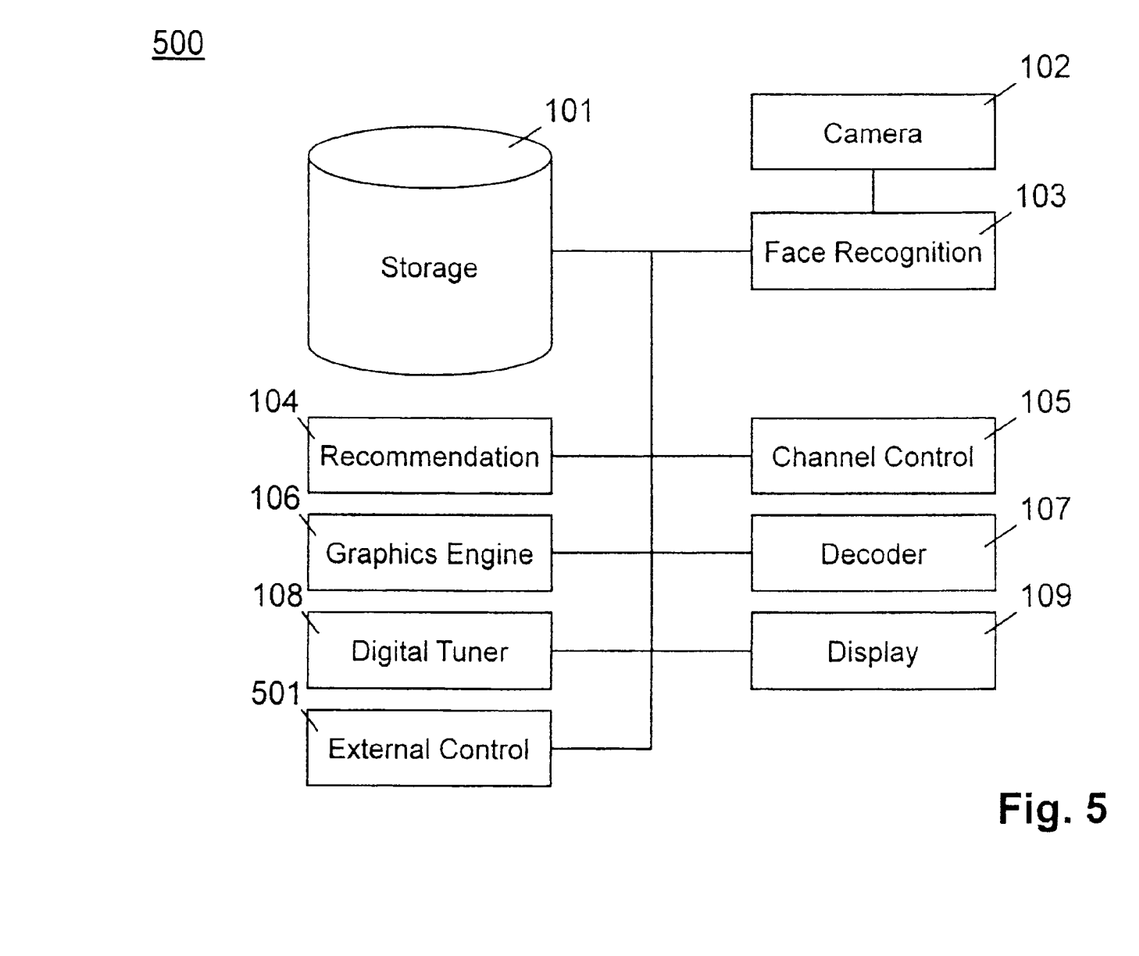
FIG. 5 shows a third embodiment of a television program selection system according to the present invention.

FIG. 5 shows a third embodiment of a television program selection system 500 according to the present invention. This system again corresponds to the system shown in FIG. 1 but additionally comprises and external control device 501. The external control 501 can be any type of device enabling a control of an external device connected to and in data communication with the television program selection system 500, e.g. via a HDMI-CEC cable. Vi the external control 501 it is possible to transmit control commands from the television program selection system 500 to an external device, e.g. a HDD-DVD recorder, a Blu-ray Disc™ recorder or the like.

Of course it is possible to combine the embodiments shown in FIGS. 1, 4 and 5, i.e. the present invention is not limited to the embodiments shown in the figures.

In an alternative embodiment also groups of users can be stored. For example the face data of two users are stored and treated as one group associated with preference data. Such a group can comprise people living together in the same household, such as wife and husband or family. The camera 102 in this case is adapted to capture an image of all users in the vicinity of the television program selection system, to transmit the data to the face recognition device 103, which in turn recognizes the number of faces and can accomplish a face recognition on each of the faces.

Alternatively or additionally, the face recognition 103 in case that the camera 102 captures an image comprising several faces, after having recognized two or more faces, the face recognition device 103 can choose only one of them, for example by measuring the face size within the picture and choosing the face with appears as largest face within the image, or the like.

In the following the detailed steps carried out according to the method of the present invention will be explained in detail with reference to FIGS. 6 to 10.

Figure 6:
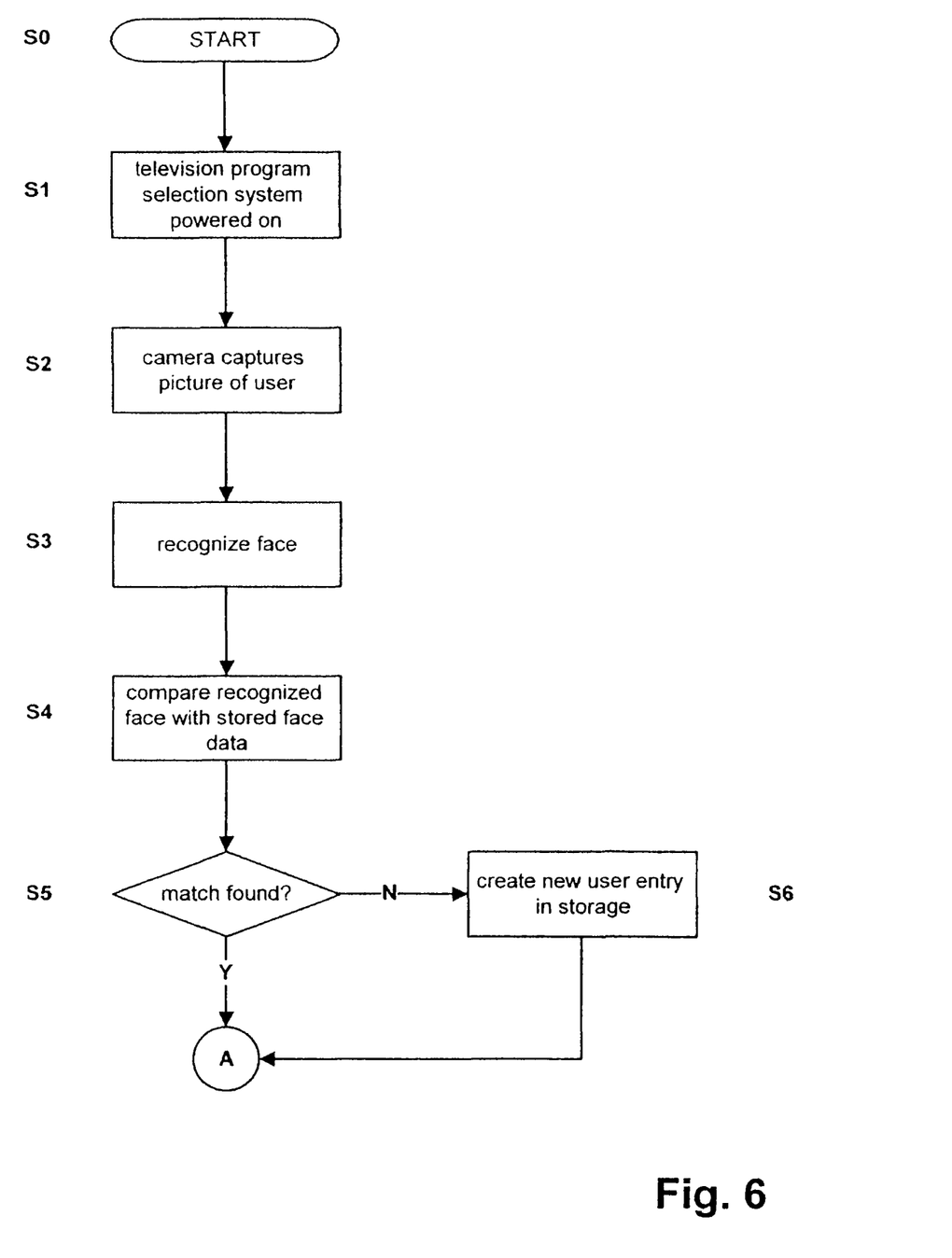
FIGS. 6 to 10 show a flow chart with the process steps according to the methods of the present invention.

FIG. 6 shows an initial phase of the process. The process starts in step S0. In step S1 the television program selection system 100, 400, 500 is turned on either by the user or automatically triggered by any possible event, e.g. a specific time of day, a detection of presence of a user or due to any other reason.

In the following step S2 the camera 102 captures the pictures of the one or more users being in the vicinity of the television program selection system 100, 400, 500. The captured picture is then transmitted to the face recognition device 103, which in the following step S3 recognizes one or more faces.

As previously described either one of the recognized faces is selected or all faces are treated as a corresponding group. The recognized face is then transmitted to the recommendation device 104 which in the following step S4 compares the recognized face with face data 202 stored in the storage 101. Alternatively, the comparison can also be carried out by the face recognition device 103, which then transmits the result of the comparison to the recommendation device 104.

In the following step S5 the recommendation device 104 or alternatively the face recognition device 103 checks whether a match has been found between the recognized face data captured by the camera 102 and face data 202 stored in the storage. In case that a match is found by the recommendation device 104, then the process continues at point A, which will be described later. If the match is found by the face recognition device 103, then the face recognition device sends the user ID 201 corresponding to the recognized face data 202 to the recommendation device 104 and the process continues at point A. Otherwise, if in step S5 it is decided by the recommendation device 104 or alternatively the face recognition device 103 that no match has been found, then in the following step S6 a new user entry 200 is created in the storage 101, optionally a user ID 201 is created and the corresponding face data 202 are stored. The process then also continues with point A.

Figure 7:
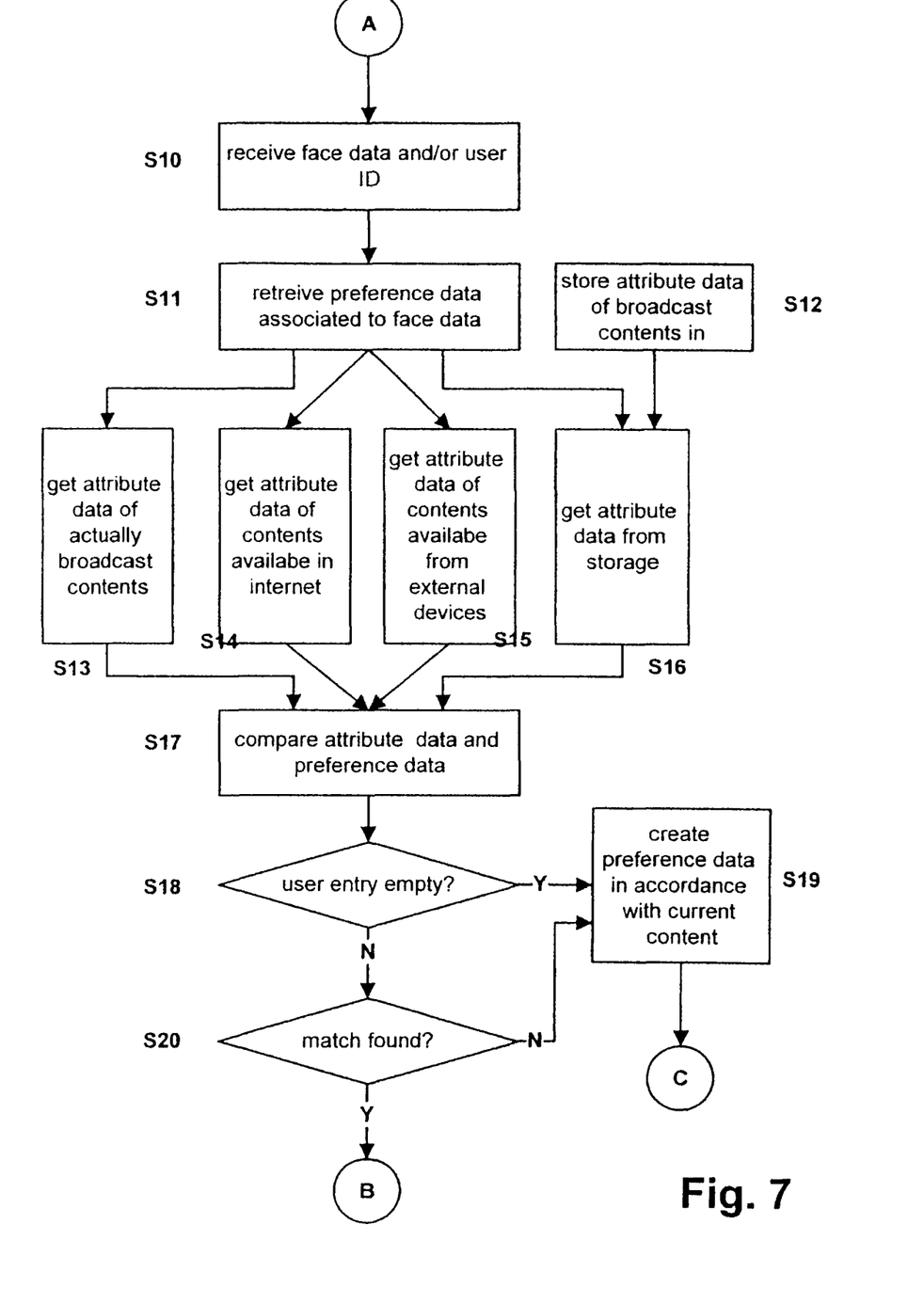

The process starting from point A will now be explained with reference to FIG. 7.

In step S10 the recommendation device 104 starts to evaluate the preference data stored in the storage and associated to the currently examined face data and/or user ID. For this purpose in the following step S11 the recommendation device 104 will retrieve and read out all preference data, i.e. all sets of attribute data, associated to the face data or current user ID from the storage 101.

In the following steps the recommendation device 104 receives attribute data including metadata of all programs currently available. Hereby, depending on the implementation of the television program selection system 100, 400, 500 different sources for television programs can be provided.

In case the television program selection system 100, 400, 500 comprises means for receiving broadcast television programs, then in the next step S13 the attribute data of actually broadcast programs are received from the decoder 107. Alternatively or additionally in step S14, in case that the television program selection system 100, 400, 500 is connected to an internet, then the attribute data of contents available via the internet, e.g. available via video on demand, are received. Alternatively or additionally in step S15, in case that a television program selection system 100, 400, 500 is connected to external devices delivering any type of content, e.g. a Blu-ray Disc™ player, a DVD player, a video camera, a personal computer, a personal digital assistant PDA, a mobile phone or the like, then also from these available programs the attribute data are received from the external device. In one embodiment, data indicating the preferred external devices of the user are stored together with the face data 202. If the user for example often uses an external input, such as HDMI 1, 2 or any other input, then this input can be chosen. Alternatively or additionally in step S16, in case that the television program selection system 100, 400, 500 comprises means for receiving broadcast programs, the attribute data of programs can also have been stored in a previous step S12 in the storage 101 so that in the next step S16 the attribute data are only read out from the storage 101.

Either all or only a part of the above described steps S13, S14, S15 and S16 can be accomplished. They can further be accomplished in parallel or in different orders.

Further, the retrieval of the preference data in step S11 can also be accomplished after the retrieval of attribute data in steps S13 to S16.

In the following step S17 the recommendation device 104 compares the preference data stored in the storage and associated to the face data 202 with the attribute data of the television programs. In the following step S18 it is checked whether the user entry comprising the preference data is empty, i.e. whether the storage comprises only an entry with face data 202 and/or user 201 but no further data. This can for example be the case in case that in previous step S6 a new user entry has just been created and no preference data are stored yet. If in step S18 it is decided that the user entry 200 is empty, then the attribute data, i.e. if present meta data and possibly additional data regarding date, time, duration or the type of the current program which is presently watched by the user are stored in step S19 in the storage as one set of attribute data, i.e. as preference data associated to the previously empty user entry 200.

Otherwise, if in step S18 it is found that a user entry 200 is not empty, then in the following step S20 it is checked whether a match is found between the stored preference data and the received attribute data.

A match can for example be found if a category, keyword and/or the like of a presently available television program is the same category, category and/or the like of the one television program, which according to the attribute data stored in the storage 101 has the longest watching duration. Alternatively, a match is found in case that an actually available television program has keywords in his title and/or description which matches the most frequent keywords in the title data and/or description data within all sets of attribute data stored within the storage 101 in relation to the corresponding user. A match can also be made dependent on the watching habits of the user, i.e. the category or type of program matching the user preferences is defined dependent on the day time. For this purpose, the data related to time/date to start watching 302 can be examined to detect, whether there are certain day times, in which the user preferred specific types of categories. Of the user for example in the morning often watches news and in the evening often watches movies, then the recommendation device 104 after analyzing the present time will rather select a news program in the morning and a movie program in the evening. The user can also have the possibility to input keywords, e.g "football" or "movie" which are used to select a television program. Of course, the above described possibilities can each be separately used or they can be combined in any appropriate way.

If a match is found then the process continues with point B, which will be described in FIG. 8. Otherwise, the process continues again with step S19, where the current program is stored and the features of the program are stored as preference data associated to the face data in the storage 101. The process then continues with point C, which will be described with reference to FIG. 9.

Figure 8:
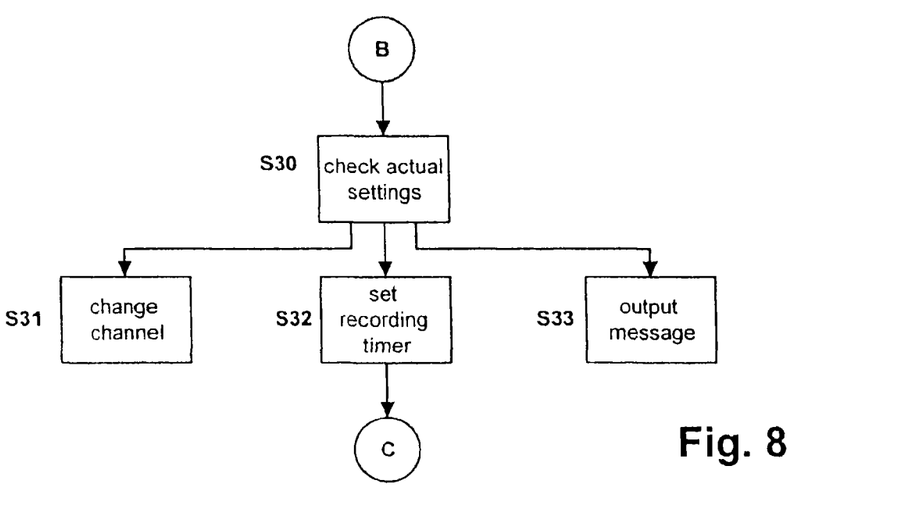

In case that a match is found between stored preference data and attribute data, the process continues with point B as shown in FIG. 8. In step S30 the recommendation device 104 may check the actual settings. This includes either predefined settings or settings by users, indicating which following steps should be accomplished in case that a match between preference data and attribute data is found. Of course, each user can input his own settings so that they are also stored together with his face data 202 in the storage 101.

Depending on the settings, different possibilities are shown in FIG. 8. Either in the following step S31, a channel change can be accomplished. For this purpose the recommendation device 104 sends a signal to the channel control 105 indicating the channel to which it should be switched. The channel control 105 then controls the digital tuner 108 to change the frequency in order to display a different channel broadcasting the program which is most likely to be of most interest to the user. More generally, if no decoder and/or tuner is present, the recommendation device 104 can display the selected program on the display 109 independent of the source of the program Alternatively, in step S32 a recording timer can be set. The recording can either start at once or a recording timer for a later moment can be set. The program can be recorded either on the storage 101 or on an external device, such as a Blu-ray Disc™ recorder or a HDD-DVD recorder. If the system comprises a recorder 401, the recorder 401 can be instructed to store the television program in his storage or in the system storage 101 now or later depending on the recording timer. Otherwise, if the system is connected to for example a Blu-ray Disc™ recorder through the external control 501 by a controllable HDMI-CEC connection, then the recommendation device 104 can request the recorder through the external control 501 to record and store the selected television program now or later.

Alternatively, in step S33 the graphics engine 106 can issue a command to display a message on the display 109. For example a message indicating that via another source or on another channel a program is currently available which might suit the preferences of the user.

Alternatively or additionally, the selected programs can be marked or highlighted in the electronic program guide EPG when the user is requesting and displaying the EPG. It is also possible to include information into an on screen display, e.g. when switching channels instead of or in addition to the channel number information can be displayed, indicating whether or how much the presently selected television program matches the user preferences.

In a further alternative, two or more of the above-described steps can be accomplished at the same time, e.g. the channel can be switched and at the same time the recording is started. The process then in any case continues with point C.

Figure 9:
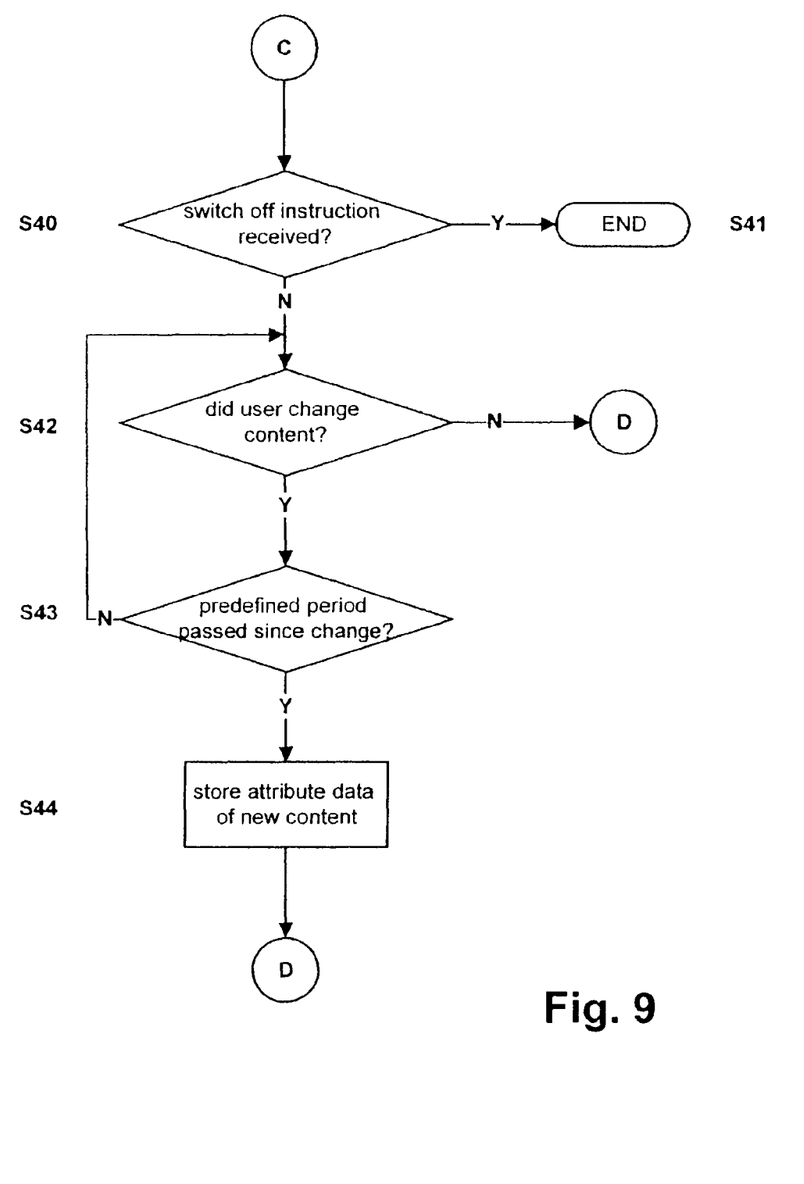

In FIG. 9 now the process steps starting with point C are shown. This is either the case if the user entry was empty, no match was found or that a match was found and the steps were taken accordingly.

In step S40 the television program selection system 100, 400, 500 checks whether the television has been turned off. If the television has turned off, then the process ends in step S41. Of course the step of checking whether the television is turned off, can also be accomplished at any other time during the whole process.

If the television was not turned off, then in the following step S40 it is checked whether a switch off instruction is received. If this is the case, then the process ends in step S41. Of course the step of checking whether a switch off instruction was received can be accomplished at any time during the process and only exemplary is shown at this point within the process for the sake of completeness.

If in step S40 no switch off instruction was received, then the process continues with step S42, where it is checked whether the user changed the displayed program.

Figure 10:
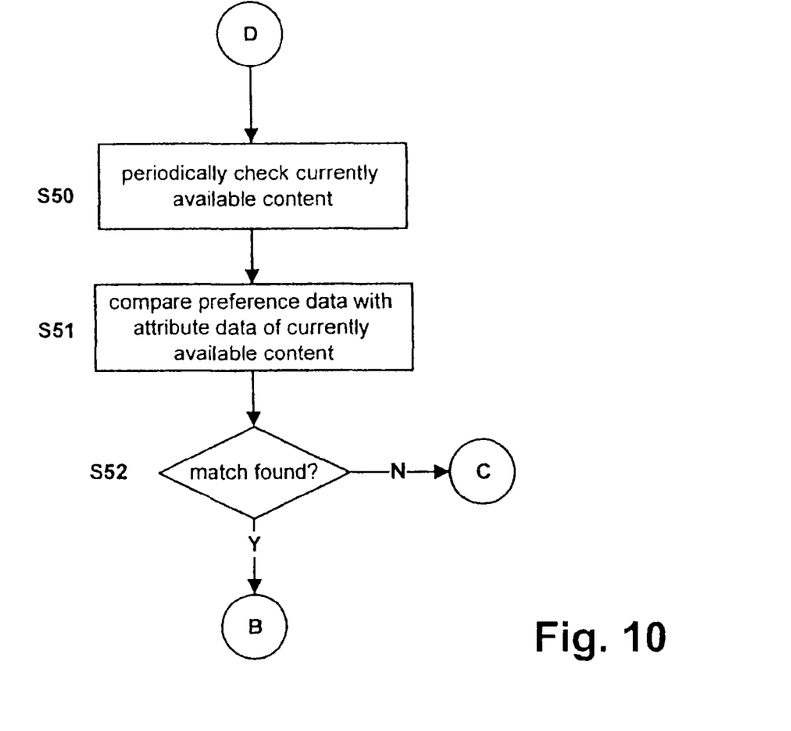

If this was not the case, then the process continues with point D, which will be described in FIG. 10.

Otherwise, in the following step S43 it is checked whether a predefined time period, e.g. one minute, has passed since the channel change. If a predefined time period has not passed in FIG. S43, then the process goes back to step S42. Otherwise, if the predefined time period has passed, then it is assumed that the new content or program is interesting for the user and accordingly the attribute data of the new television program are stored in a storage 101 and associated to the face data 202 and/or the user ID 201. The process then also continues with point D, which will be explained with reference to FIG. 10.

The recommendation device 104 periodically, e.g. every 10 minutes, checks the currently available programs and in step S51 compares the attribute data of the currently available, e.g. broadcast programs with the preference data of the user currently using the television program selection system 100, 400, 500. In step S52 it is checked whether a match has been found, and in case that a match has been found the process goes back to point B, where according steps are accomplished dependent on the respective settings. For example, the settings can prescribe, that when a user starts watching television, then in the first recommendation step the channel should be changed to a first television program, which matches the user preferences. If during the watching of this first television program a second television program also matching the use preferences is found, then instead of a channel switch only an indication of a message could be provided in order to avoid disturbing the user too much when watching his first television program. For example the graphics engine 106 can display a notification on the display 109 "Recommended TV program found. Check the menu".

Otherwise, if in step S52 no match has been found, then the process continues with point C.

The present invention therefore makes it much easier for the user to select a preferred television program either for watching, recording or the like, since the user does not have to accomplish any registration of selection steps. Due to the camera and the automatic comparison of the captured face data with stored face data, the user does not have to input key words for recommendation or automatic recording. Further, since each user is uniquely identified, a proper and individual television program for each user can be uniquely selected and either recommended, recorded or the like.

The invention claimed is:

1. A television program selection system, comprising:
a storage device to store face data of one or more users and to store preference data associated with the face data, said preference data indicating respective preferences of the one or more users,
a camera to capture an image of a user, and
a recommendation device to, in a case that the captured image corresponds to one portion of the stored face data,
compare attribute data of each of a first plurality of television programs currently being broadcast and currently available for viewing with the associated stored preference data,
automatically select, without user input, a television program, of the first plurality of currently available television programs currently being broadcast, which has attribute data matching the associated stored preference data, the selected television program always having a longest watching duration of any of the currently available television programs currently being broadcast having attribute data matching the associated stored preference data,
automatically display, without user input, the selected television program on a display based on predefined settings set by the user prior to the selection of the selected television program,
while displaying the selected television program on the display, compare attribute data of each of a second plurality of television programs currently being broadcast and currently available for viewing with the associated stored preference data, automatically select, without user input, at least one television program other than the displayed selected television program, of the second plurality of currently available television programs currently being broadcast, which has attribute data matching the associated stored preference data, and automatically display, without user input, on the display, while displaying the selected television program on the display, a recommendation message regarding said other selected at least one television program of the second plurality of currently available televisions programs currently being broadcast without displaying said other selected at least one television program based on the predefined settings set by the user prior to the selection of the selected television program.

2. The system according to claim 1, wherein said attribute data describes features of television programs currently being broadcast and currently available and includes metadata of said currently being broadcast and currently available television programs.

3. The system according to claim 1, wherein said preference data includes at least one of date and time of watching programs, duration of watching programs, program titles, program description, program category, actors, and other data indicating preferences.

4. The system according to claim 1, further comprising at least one of a recorder to record television programs in the storage device, and external control circuitry to control recording on an external device.

5. The system according to claim 4, wherein the recommendation device issues a recording instruction for the selected television program.

6. The system according claim 4, wherein the external device is one of a HDD-DVD recorder and a Blu-Ray Disc recorder.

7. The system according to claim 1, further comprising the display.

8. The system according to claim 7, wherein the recommendation device displays a message on the display indicating the selected television program.

9. The system according to claim 1,
wherein the system updates the stored preference data when the selected television program of the first plurality of currently available television programs currently being broadcast is displayed on the display for a predetermined amount of time, and
wherein the automatic selection of said other selected at least one television program is performed based on the updated stored preference data.

10. A television comprising the system according to any of the preceding claims.

11. A recording method for recording a selected television program, comprising:
storing, using a storage device, face data of one or more users and storing preference data associated with the face data, said preference data indicating respective preferences of the one or more users,
capturing an image of a user,
in a case that the captured image corresponds to one portion of the stored face data,
comparing attribute data of each of a first plurality of television programs currently being broadcast and currently available for viewing with the associated stored preference data,
automatically selecting, without user input, a television program, of the first plurality of currently available television programs currently being broadcast, which has attribute data matching the associated stored preference data, the selected television program always having a longest watching duration of any of the currently available television programs currently being broadcast having attribute data matching the associated stored preference data,
automatically issuing, without user input, a recoding command to a recording device to record the selected television program based on predefined settings set by the user prior to the selection of the selected television program,
displaying, without user input, the selected television program based on the predefined settings set by the user prior to the selection of the selected television program,
while displaying the selected television program, comparing attribute data of each of a second plurality of television programs currently being broadcast and currently available for viewing with the associated stored preference data,
automatically selecting, without user input, at least one television program other than the displayed selected television program, of the second plurality of currently available television programs currently being broadcast, which has attribute data matching the associated stored preference data, and
automatically displaying, without user input, on the display, while displaying the selected television program on the display, a recommendation message regarding said other selected television program of the second plurality of currently available television programs currently being broadcast without displaying said other selected television program based on the predefined settings set by the user prior to the selection of the selected television program.

12. A recommendation method for recommending a selected television program, comprising:
storing, using a storage device, face data of one or more users and storing preference data associated with the face data, said preference data indicating respective preferences of the one or more users,
capturing an image of a user,
in a case that the captured image corresponds to one portion of the stored face data,
comparing attribute data of each of a first plurality of television programs currently being broadcast and currently available for viewing with the associated stored preference data,
automatically selecting, without user input, a television program, of the first plurality of currently available television programs currently being broadcast, which has attribute data matching the associated stored preference data, the selected television program always having a longest watching duration of any of the currently available television programs currently being broadcast having attribute data matching the associated stored preference data,
automatically recommending, without user input, the selected television program to the user by displaying the selected television program on a display based on predefined settings set by the user prior to the selection of the selected television program,
while displaying the selected television program on the display, comparing attribute data of each of a second plurality of television programs currently being broadcast and currently available for viewing with the associated stored preference data, automatically selecting, without user input, at least one television program other than the displayed selected television program, of the second plurality of currently available television programs currently being broadcast, which has attribute data matching the associated stored preference data, and automatically displaying, without user input, on the display, while displaying the selected television program on the display, a recommendation message regarding said other selected television program of the second plurality of currently available television programs currently being broadcast without displaying said other selected television program based on the predefined settings set by the user prior to the selection of the selected television program.

13. The method according to claim 12, wherein said recommending includes displaying a message on the display indicating the selected television program.

14. The method according to claim 12, further comprising updating the stored preference data when the selected television program of the first plurality of currently available television programs currently being broadcast is displayed on the display for a preset period of time.

15. A system for recording a selected television program, comprising:

means for storing face data of one or more users and for storing preference data associated with the face data, said preference data indicating respective preferences of the one or more users, means for capturing an image of a user, means for comparing attribute data of each of a first plurality of television programs currently being broadcast and currently available for viewing with the associated stored preference data, in a case that the captured image corresponds to one portion of the stored face data, means for automatically selecting, without user input, a television program, of the first plurality of currently available television programs currently being broadcast, which has attribute data matching the associated stored preference data, the selected television program always having a longest watching duration of any of the currently available television programs currently being broadcast having attribute data matching the associated stored preference data, means for automatically issuing, without user input, a recoding command to a recording device to record the selected television program based on predefined settings set by the user prior to the automatic selection of the television program, and means for automatically recommending, without user input, the selected television program to the user by displaying the selected television program based on the predefined settings set by the user prior to the selection of the selected television program, wherein said means for comparing compares, while displaying the selected television program, attribute data of each of a second plurality of television programs currently being broadcast and currently available for viewing with the associated stored preference data, wherein said means for automatically selecting automatically selects at least one television program other than the displayed selected television program, of the second plurality of currently available television programs currently being broadcast, which has attribute data matching the associated stored preference data, and wherein said means for automatically recommending outputs, while displaying the selected television program, a recommendation message regarding said other selected television program of the second plurality of currently available televisions programs currently being broadcast without displaying said other selected at least one television program based on the predefined settings set by the user prior to the selection of the selected television program.

16. A system for recommending a selected television program comprising:

means for storing face data of one or more users and for storing preference data associated with the face data, said preference data indicating respective preferences of the one or more users, means for capturing an image of a user, means for comparing attribute data of each of a first plurality of television programs currently being broadcast and currently available for viewing with the associated stored preference data, in a case that the captured image corresponds to one portion of the stored face data, means for automatically selecting, without user input, a television program, of the first plurality of currently available television programs currently being broadcast, which has attribute data matching the associated stored preference data, the selected television program always having a longest watching duration of any of the currently available television programs currently being broadcast having attribute data matching the associated stored preference data, and means for automatically recommending, without user input, the selected television program to the user by displaying the selected television program based on predefined settings set by the user prior to the selection of the selected television program, wherein said means for comparing compares, while displaying the selected television program, attribute data of each of a second plurality of television programs currently being broadcast and currently available for viewing with the associated stored preference data, wherein said means for automatically selecting automatically selects at least one television program other than the displayed selected television program, of the second plurality of currently available television programs currently being broadcast, which has attribute data matching the associated stored preference data, and wherein said means for automatically recommending outputs, while displaying the selected television program on the display, a recommendation message regarding said other selected television program of the second plurality of currently available televisions programs currently being broadcast without displaying said other selected television program based on the predefined settings set by the user prior to the selection of the selected television program.

17. A non-transitory computer-readable storage medium storing computer-readable instructions that, when executed by a computer, cause the computer to perform a method comprising:

storing face data of one or more users and storing preference data associated with the face data, said preference data indicating respective preferences of the one or more users, capturing an image of a user, in a case that the captured image corresponds to one portion of the stored face data, comparing attribute data of each of a first plurality of television programs currently being broadcast and currently available for viewing with the associated stored preference data, automatically selecting, without user input, a television program, of the first plurality of currently available television programs currently being broadcast, which has attribute data matching the associated stored preference data, the selected television program always having a longest watching duration of any of the currently available television programs currently being broadcast having attribute data matching the associated stored preference data, automatically issuing, without user input, a recoding command to a recording device to record the selected television program based on predefined settings set by the user prior to the selection of the selected television program, automatically causing display, without user input, of the selected television program based on the predefined settings set by the user prior to the selection of the selected television program, while the selected television program is displayed, periodically comparing attribute data of each of a second plurality of television programs currently being broadcast and currently available for viewing with the associated stored preference data, automatically selecting, without user input, at least one television program other than the displayed selected television program, of the second plurality of currently available television programs currently being broadcast, which has attribute data matching the associated stored preference data, and automatically causing, without user input, display of, while displaying the selected television program on the display, a recommendation message regarding said other selected television program of the second plurality of currently available television programs currently being broadcast without displaying said other selected television program based on the predefined settings set by the user prior to the selection of the selected television program.

18. A non-transitory computer-readable storage medium storing computer-readable instructions that, when executed by a computer, cause the computer to perform a method comprising:

storing face data of one or more users and storing preference data associated with the face data, said preference data indicating respective preferences of the one or more users, capturing an image of a user, in a case that the captured image corresponds to one portion of the stored face data, comparing attribute data of each of a first plurality of television programs currently being broadcast and currently available for viewing with the associated stored preference data, automatically selecting, without user input, a television program, of the first plurality of currently available television programs currently being broadcast, which has attribute data matching the associated stored preference data, automatically recommending, without user input, the selected television program to the user by displaying the selected television program on a display based on predefined settings set by the user prior to the selection of the selected television program, while displaying the selected television program on the display, comparing attribute data of each of a second plurality of television programs currently being broadcast and currently available for viewing with the associated stored preference data, automatically selecting, without user input, at least one television program other than the displayed selected television program, of the second plurality of currently available television programs currently being broadcast, which has attribute data matching the associated stored preference data, and automatically displaying, without user input, on the display, while displaying the selected television program on the display, a recommendation message regarding said other selected television program of the second plurality of currently available television programs currently being broadcast without displaying said other selected television program based on the predefined settings set by the user prior to the selection of the selected television program.

* * * * *